United States Patent [19]

Chlanda et al.

[11] Patent Number: 4,999,095

[45] Date of Patent: Mar. 12, 1991

[54] RECOVERY OF MIXED ACIDS FROM MIXED SALTS

[75] Inventors: Frederick P. Chlanda, Rockaway; Krishnamurthy N. Mani, Denville, both of N.J.

[73] Assignee: Allied-Signal Inc., Morris Township, Morris County, N.J.

[21] Appl. No.: 196,829

[22] Filed: May 16, 1988

Related U.S. Application Data

[63] Continuation of Ser. No. 729,848, May 3, 1985, abandoned.

[51] Int. Cl.$^5$ .............................................. B01D 13/02
[52] U.S. Cl. ............................ 204/182.4; 204/182.5; 204/301
[58] Field of Search ................... 204/182.4, 182.5, 301

[56] References Cited

U.S. PATENT DOCUMENTS

| | | | |
|---|---|---|---|
| 3,475,122 | 10/1969 | McRae et al. | 23/178 |
| 3,477,815 | 11/1969 | Miller et al. | 23/178 |
| 3,485,581 | 12/1969 | Miller et al. | 23/178 |
| 3,654,125 | 4/1972 | Leitz | 204/182.4 X |
| 3,787,304 | 1/1974 | Chlanda et al. | 204/182.4 |
| 3,788,959 | 1/1974 | Smith | 204/182.4 |
| 3,933,605 | 1/1976 | Butler et al. | 204/182.4 X |
| 4,024,043 | 5/1977 | Dege et al. | 204/182.4 X |
| 4,082,835 | 4/1978 | Chlanda et al. | 423/242 |
| 4,107,015 | 8/1978 | Chlanda et al. | 423/242 |
| 4,149,946 | 4/1979 | Burke | 204/182.4 X |
| 4,219,396 | 8/1980 | Gancy et al. | 204/182.5 |
| 4,504,373 | 3/1985 | Mani et al. | 204/180 |

FOREIGN PATENT DOCUMENTS

| | | |
|---|---|---|
| 55-44588 | 3/1980 | Japan. |
| 1105515 | 7/1984 | U.S.S.R. . |

OTHER PUBLICATIONS

K. Nagasubramanian et al., Use of Bipolar Membranes .., *Journal of Membrane Science*, 2 (1977), pp. 109–124.
Patent Abstracts of Japan, vol. 4, No. 81 (C-14) (563), Jun. 11th, 1980; & JP-A-55 44 588 (Sumitomo Kinzoku Kogyo K.K.), 28-03-80.
Metal Finishing Abstracts, vol. 23 (1981), Mar./Apr., n2, Teddington, Middlesex, England.
Chemical Abstracts, vol. 101, No. 20, Nov. 5th, 1984, p. 292, abstr. no. 176076x, Columbus, Ohio, U.S.A.
Derwent Abstract, M25E36, week 8508, issued 03.04.85.

*Primary Examiner*—John F. Niebling
*Assistant Examiner*—William T. Leader
*Attorney, Agent, or Firm*—Gerhard H. Fuchs; Karen A. Michaelson

[57] ABSTRACT

A process for recovering concentrated mixed acids comprising HF from mixed salts at a high efficiency is disclosed. The process comprises the steps of providing an electrodialytic water splitter comprising at least one unit cell, each cell comprising a first compartment and a second compartment, feeding an aqueous solution comprising at least two salts formed from at least two different anions to the first compartment, one of said anions being fluoride, feeding a liquid comprising water to the second compartment, passing current through said electrodialytic water splitter to produce an aqueous product comprising mixed acids formed from the different anions in the second compartment, and an aqueous salt-containing product comprising a reduced concentration of said anions in the first compartment, and recovering aqueous products from the second compartment. The process is particularly useful in the production of concentrated $HNO_3$ at unexpectedly high current efficiencies, and has particular utility in the area of regenerating stainless steel pickling acid mixtures comprising HF and $HNO_3$.

15 Claims, 5 Drawing Sheets

GENERATION OF HNO₃ FROM KNO₃

SALT ANALYSIS

ACID ANALYSIS

RECOVERY OF MIXED ACIDS FROM MIXED SALTS

This application is a continuation of application Ser. No. 729,848 filed May 3, 1985, now abandoned.

BACKGROUND OF THE INVENTION

This invention relates to an electrodialytic process for recovering mixed acids from mixed salts. More particularly, the invention is directed to the recovery of mixed acids comprising HF and, for example, $HNO_3$ from spent process materials such as pickling liquors by a process which employs a three-compartment electrodialytic water splitter.

Pickling baths, for example, are employed to remove scale, oxides, and other impurities from metal surfaces such as stainless steel. These baths comprise inorganic acids such as hydrochloric acid, sulfuric acid, phosphoric acid, nitric acid, and hydrofluoric acid, and commonly are mixtures thereof. Eventually, the acids in these baths are exhausted due to the reactions of the acids with the oxides, scale, etc. Consequently, the pickling acids are converted to a spent solution comprising acidified mixed salts. This spent solution must then be disposed of and the acids lost must be replaced. The acids, particularly hydrofluoric and nitric, are costly to replace. Moreover, the toxicity of the spent materials, especially hydrofluoric acid, can create significant environmental damage if improperly disposed of, and the large volumes of the exhausted baths add a very substantial cost to pickling processes due to the cost of disposing of these materials.

Processes for regenerating processing materials are known. For example, U.S. Pat. Nos. 3,477,815 and 3,485,581 disclose processes for removing $SO_2$ from combustion gases employing a scrubbing solution which can be thermally regenerated, and U.S. Pat. No. 3,475,112 discloses a process for removing $SO_2$ from combustion gases using a scrubbing solution which can be electrolytically regenerated. Recently, electrodialytic methods have been disclosed for regenerating process solutions. In U.S. Pat. Nos. 4,082,835 and 4,107,015, processes are disclosed for regenerating scrubbing solutions used in stripping $SO_x$ from flue gases by feeding the spent solutions through an electrodialytic water splitter.

While concentrated acids can be produced by electrodialytic water splitting methods, such production is limited by the current efficiency of producing these acids. For example, the current efficiency of producing 5% $HNO_3$ is only about 0.6. Therefore, many processes employing electrodialysis produce relatively dilute acid solutions to insure high current efficiency. For example, in U.S. Pat. No. 4,504,373, a process is disclosed for regenerating a dilute sulfuric acid solution for use in the processing of rayon.

BRIEF DESCRIPTION OF THE INVENTION

We have unexpectedly discovered a process for recovering concentrated mixed acids comprising HF from mixed salts at a high current efficiency. The process comprises the steps of:

(a) providing an electrodialytic water splitter comprising at least one unit cell, each unit cell comprising a first compartment and a second compartment;

(b) feeding an aqueous solution comprising at least two salts formed from at least two different anions to the first compartment, one of said anions being fluoride;

(c) feeding a liquid comprising water to the second compartment;

(d) passing current through said electrodialytic water splitter to produce an aqueous product comprising mixed acids formed from the different anions in the second compartment, and an aqueous salt-containing product comprising a reduced concentration of said anions in the first compartment; and (e) recovering aqueous products from the second compartment.

Our process is particularly useful in the production of concentrated $HNO_3$ at unexpectedly high current efficiencies, and has particular utility in the area of regenerating stainless steel pickling acid mixtures comprising HF and $HNO_3$.

DETAILED DESCRIPTION

The preferred apparatus employed in performing the basic process of the present invention is known in the art as a three-compartment electrodialytic water splitter. A three-compartment electrodialytic water splitter comprises at least one unit cell, each unit cell comprising cation, water-splitting, and anion membranes arranged in alternating fashion to define base, acid, and salt compartments. A typical unit cell is schematically illustrated as unit cell 13 in FIG. 1.

Employed in each unit cell are means for splitting water into hydrogen ions and hydroxyl ions (water-splitting membrane). Most preferably, the means for splitting water into hydrogen and hydroxyl ions is a bipolar membrane. Examples of bipolar membranes which are particularly useful include those described in U.S. Pat. No. 2,829,095 to Oda et al. (which has reference to water splitting generally), in U.S. Pat. No. 4,024,043 (which describes a single film bipolar membrane), and in U.S. Pat. No. 4,116,889 (which describes a cast bipolar membrane). However, any means capable of splitting water into hydrogen and hydroxyl ions may be used; for example, spaced apart anion and cation membranes having water disposed therebetween.

The cation membranes employed in the electrodialytic water splitter may be moderately acidic (e.g., phosphonic group-containing) or strongly acidic (e.g., sulfonic group-containing) cation permselective membranes having a low resistance at the pH at which they are employed. Particularly useful cation membranes are Dupont's Nafion® acidic fluorocarbon membranes, especially Nafion® 110, 901, and 324 cation membranes.

The anion membranes used in the electrodialytic water splitter are strongly, mildly, or weakly basic anion permselective membranes. Usable membranes are, for example, commercially available from Ionics, Inc., Watertown, Mass. (sold as Ionics 204-UZL-386 anion membrane), or from Asahi Glass Co. (sold under the trade name Selemion® AMV or ASV anion permselective membranes).

Figure 1:
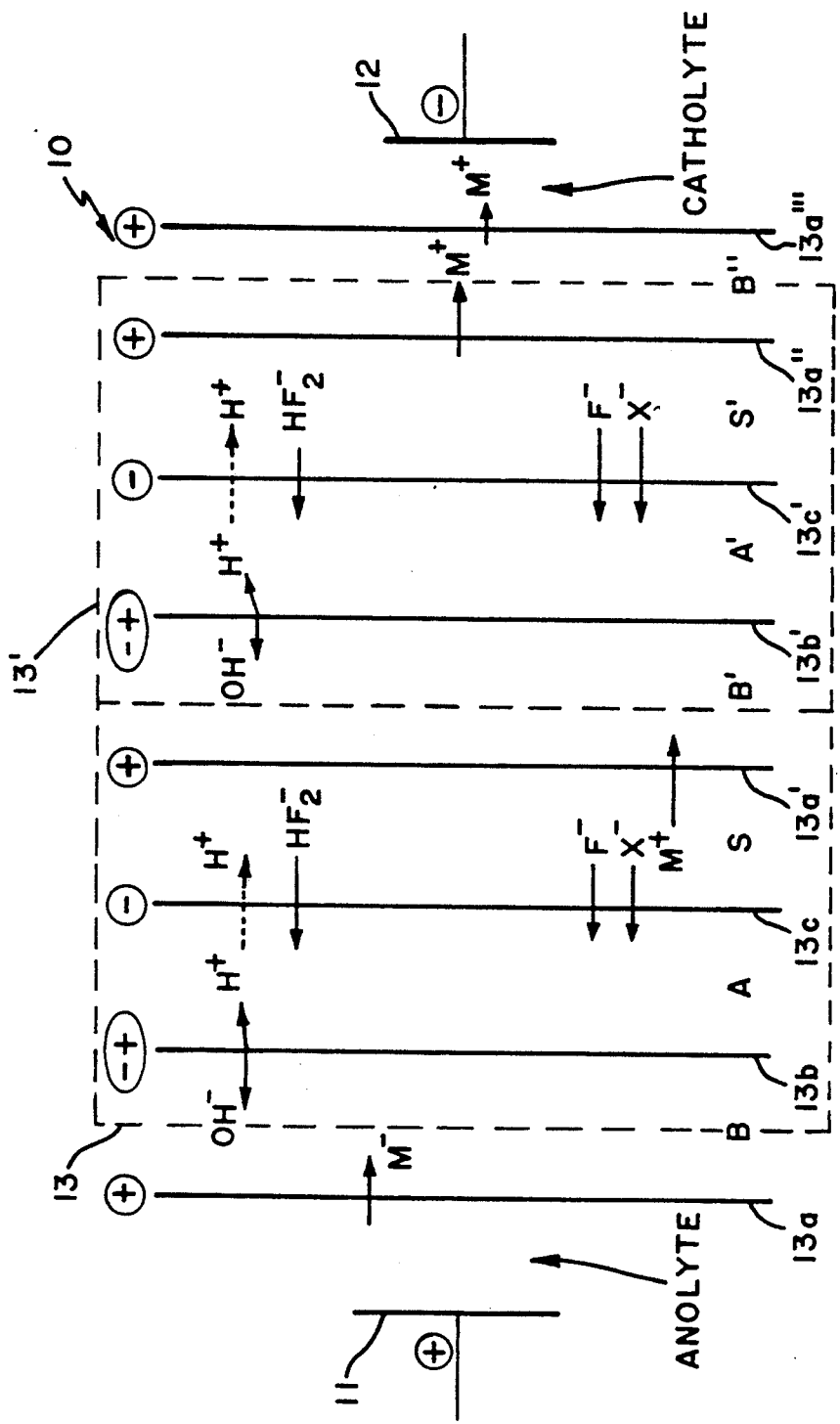
FIG. 1 schematically illustrates a three-compartment electrodialytic water splitter employed for carrying out the process of the present invention.

FIG. 1 schematically illustrates a typical design of a three-compartment water splitter 10 comprising two unit cells. As shown, the water splitter comprises, in series, an anode (e.g., a platinum anode), an anolyte compartment, alternating base B, acid A, and salt S compartments, a catholyte compartment, and a cathode 12 (e.g., a platinum cathode). The unit cells 13 and 13' are defined by serially arranged membranes as follows: bipolar membrane 13b, anion permselective membrane 13c, and cation permselective membrane 13a', and bipolar membrane 13b', anion permselective membrane 13c', and cation permselective membrane 13a'', respectively.

In accordance with the invention, the anolyte and catholyte compartments would contain a salt, base or acid solution (e.g., KOH in the arrangement illustrated in FIG. 1), the base B and acid A compartments would initially contain a liquid comprising water, and the salts compartment would initially contain a mixed salt solution comprising a fluoride salt MF and a salt MX of a different (second) anion (e.g., KF and $KNO_3$). Splitting of the mixed salts into acid and base commences by applying a direct current through the water splitter 10 from the anode 11 to the cathode 12.

In the acid compartment, hydrogen ions ($H^+$) are added via the function of the bipolar membrane 13b. Simultaneously, anions (designated $F^-$ and $X^-$ in the drawings) of the salts are transported across the anion membrane 13c into the acid compartment. The reaction of the hydrogen ions with the anions yields a mixed acid product comprising HF and HX. The use of the designation $X^-$ (and from that MX or HX) refers not only to monovalent anions other than $F^-$ but also to divalent anions, such as sulfates, and trivalent anions, such as phosphates. Ordinarily, the efficiency of HX acid production in the acid compartment would be limited by the leakage of $H^+$ ions back into the salt compartment. Applicants have unexpectedly discovered that, due to the presence of fluoride ions in the salt compartment, the hydrogen ions are believed to preferentially react with the fluoride to produce a bifluroide anion, $HF_2^-$ which, in turn, is transported back across the anion membrane 13c in preference to the fluoride anion, $F^-$, thus returning the lost hydrogen ion to the acid compartment. Consequently, more hydrogen ions are available to react with the anion $X^-$, the result of which is the more efficient production of HX.

Cations in the salt compartment simultaneously pass through the cation membrane 13a to the base B compartment. In the base B compartment, the cations, $M^+$, react with the hydroxyl ions generated by the bipolar membrane 13b to produce a basified solution. Consequently, the solution remaining in the salt compartment is depleted in both salts.

As indicated in FIG. 1, cations migrate through cation membrane 13a from the anolyte compartment and similarly pass from the base compartment through the cation membrane 13a''' to the catholyte compartment. Therefore, the anolyte and catholyte solutions are typically continuously recirculated from the anolyte compartment to the catholyte compartment and back (or the reverse) to maintain a substantially constant concentration of base (salt or acid) in each compartment.

It should be understood that the electrodialytic water splitter can be operated in a batch mode, a continuous mode, or variations thereof. It should also be readily apparent that product solutions or portions thereof (e.g., when using a feed and bleed apportionment operation) be recycled for further concentration. Moreover, it should be apparent that mechanisms for serial feed through the compartments (e.g., B to B') may be employed. These and other modifications, changes and alterations to the design of the water splitter will not affect the scope of the invention and will be obvious to thos or ordinary skill.

The water splitter is ordinarily supplied with a direct current ranging from about 30 amps/ft$^2$ ($\approx$300 A/m$^2$) to about 200 amps/ft$^2$ ($\approx$2000 A/m$^2$), preferably from about 80 A/ft$^2$ ($\approx$800 A/m$^2$) to about 120 A/ft$^2$ ($\approx$1200 A/m$^2$) amps. The system normally operates at a temperature of between about 10° C. and about 80° C. with a temperature range of between about 30° C. and 55° C. being preferred.

Figure 2:
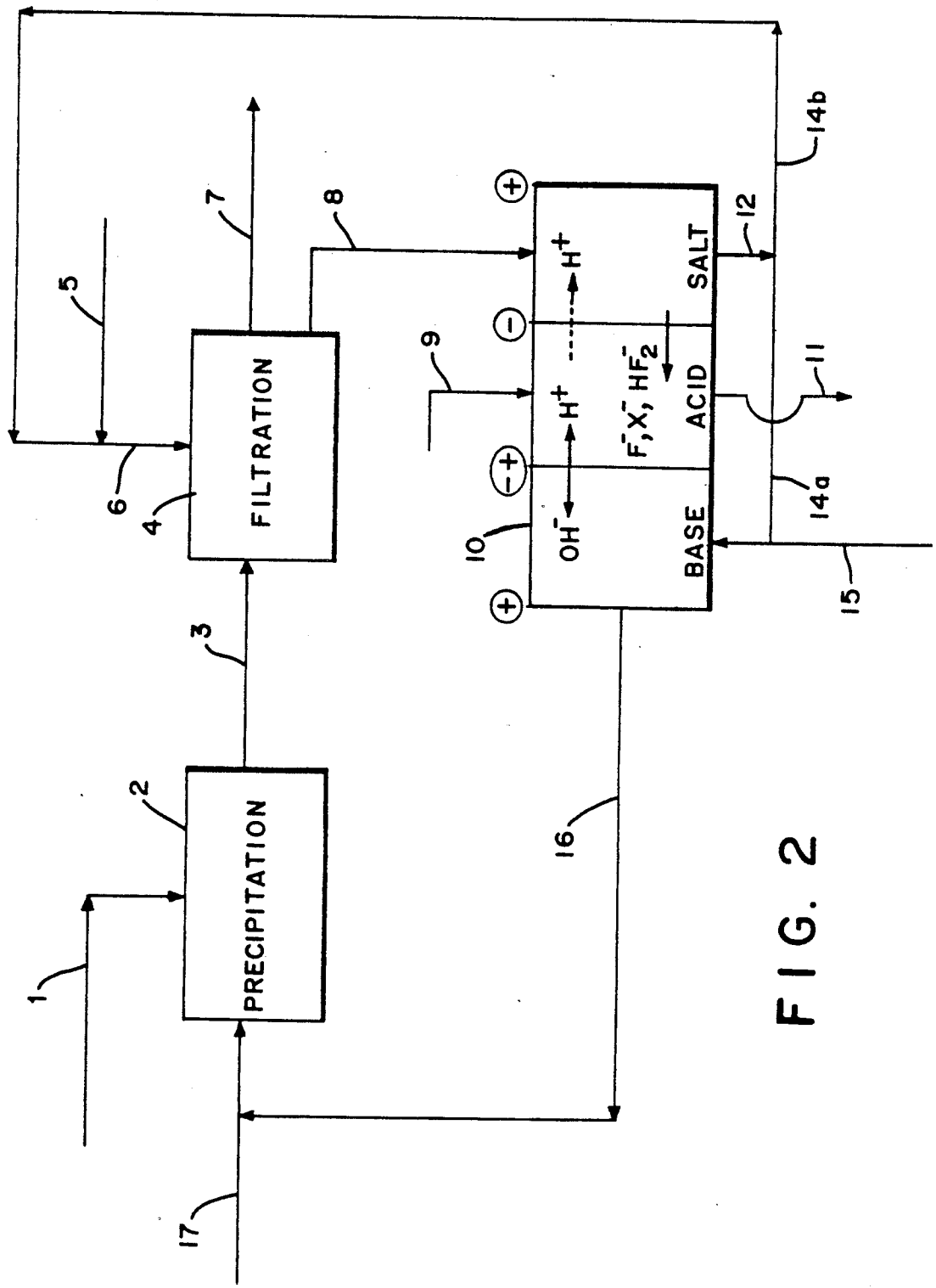
FIG. 2 schematically illustrates a preferred embodiment of applicants' process employing a three-compartment electrodialytic water splitter of the type illustrated in FIG. 1.

A preferred embodiment of the present invention is schematically illustrated in FIG. 2. Spent process material comprising fluoride anions and anions of another kind, for example spent pickling bath liquor comprising acidified fluoride and nitrate salts, is removed from the manufacturing operation and supplied through line 1 to a precipitation chamber 2. To the precipitation chamber 2, is supplied a basified solution (e.g., KOH, NaOH, $NH_4OH$, or mixtures thereof, preferably an alkali metal hydroxide, and most preferably KOH) through line 17 for contact with the spent process material. In the event the spent process material contains heavy metal ions (for example, Ni, Fe, Cr, Mn, etc.), the basified solution will react to form hydroxides thereof which will precipitate out. The resulting product (for example a suspension) is then fed through line 3 to a filtration unit (e.g., a plate and frame filter press). In filtration unit 4, the precipitate is filtered from the resulting product and may be washed with, for example, water supplied from line 5 via line 6, and/or with an aqueous depleted salt solution from line 6. The remaining solid is then withdrawn via line 7.

The aqueous filtrate of soluble mixed salts comprising a fluoride salt is then fed via line 8 to each salt compartment of the three-compartment electrodialytic water splitter 10. A liquid comprising water is fed to the acid compartment via line 9, and a liquid comprising water such as aqueous depleted salt solution supplied via line 14a is fed to the base compartment via line 15.

The operation of a three-compartment electrodialytic water splitter is as described with respect to FIG. 1, with mixed acid product being withdrawn via line 11, depleted salt being withdrawn via line 12, and basified solution being withdrawn via line 16. The mixed acid product from line 11 can be directly recycled to the manufacturing process (e.g., to a pickling bath), stored for subsequent use or sale, or recycled through the electrodialytic water splitter for further concentration or some combination thereof. The depleted salt solution from line 12 can be split into two streams via lines 14a and 14b. A portion of the aqueous depleted salt can be recycled (via line 6) through the filtration unit 4 and back to the salt compartment while another portion can be supplied to the base compartment lines 14a and 15 for basification. In addition, the depleted salt may be used to dilute the process liquor or may be concentrated by, for example, reverse osmosis or electrodialysis to yield a relatively concentrated salt solution (which may be reintroduced into the water splitter) and a relatively pure water stream (which may be used for washing the precipitate or as make-up water in the electrodialysis process). The basified solution (either as a relatively pure base or as a basified salt solution when depleted salt is supplied) is recycled from the electrodialytic water splitter via line 16 and 17 to the precipitation unit 2.

The process of the present invention is capable of operating with an aqueous mixed salt-containing solution having varied concentration. Typically, the concentration of the mixed salts should be at least about 0.4 molal, and preferably is at least about 1 molal. More importantly, however, the concentration of fluoride anion in the mixed salts should be at least about 0.1M, preferably at least about 0.2M, and most preferably at least about 0.4M. Generally, the fluoride concentration is between 0.1M and about 3.0M, preferably between about 0.2M and 2.0M and most preferably between about 0.4M and 1.0M.

The liquid supplied to the acid compartment comprises water and is generally selected from the group consisting of water, aqueous acid solutions or dilute salt solutions. The liquid supplied to the base compartment also comprises water and is generally selected from the group consisting of water, aqueous basic solutions, and depleted salt solutions (e.g., from the salt compartment). Feedstreams to both the acid and base compartments can be supplied either by independent supply systems, through a recycle of all or part of the liquid removed from a particular compartment, or some combination thereof.

Figure 3:
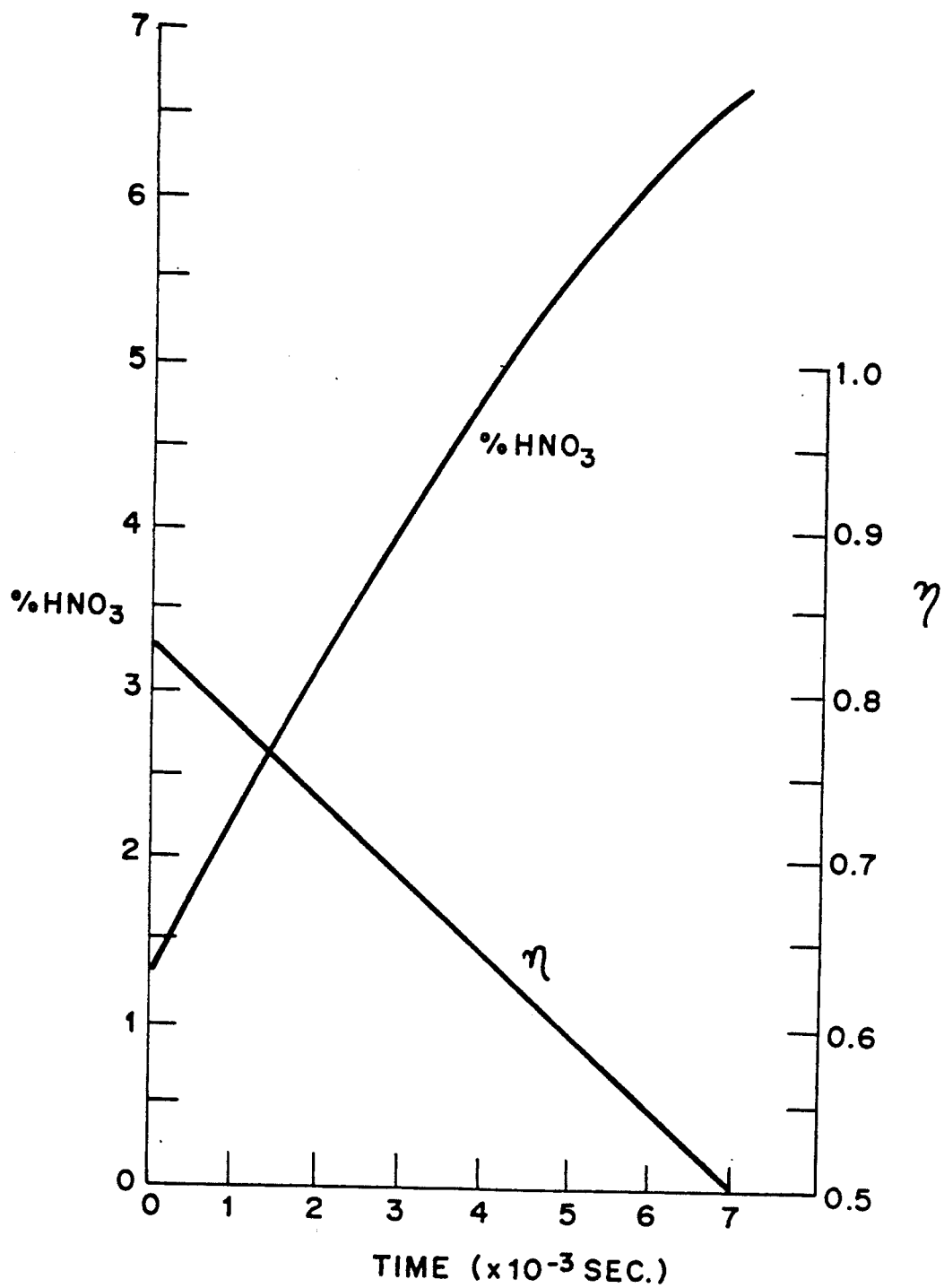
FIG. 3 graphically illustrates the decrease in efficiency of electrodialytic water splitting processes as one attempts to produce increasing concentration of a strong acid.
Figure 4:
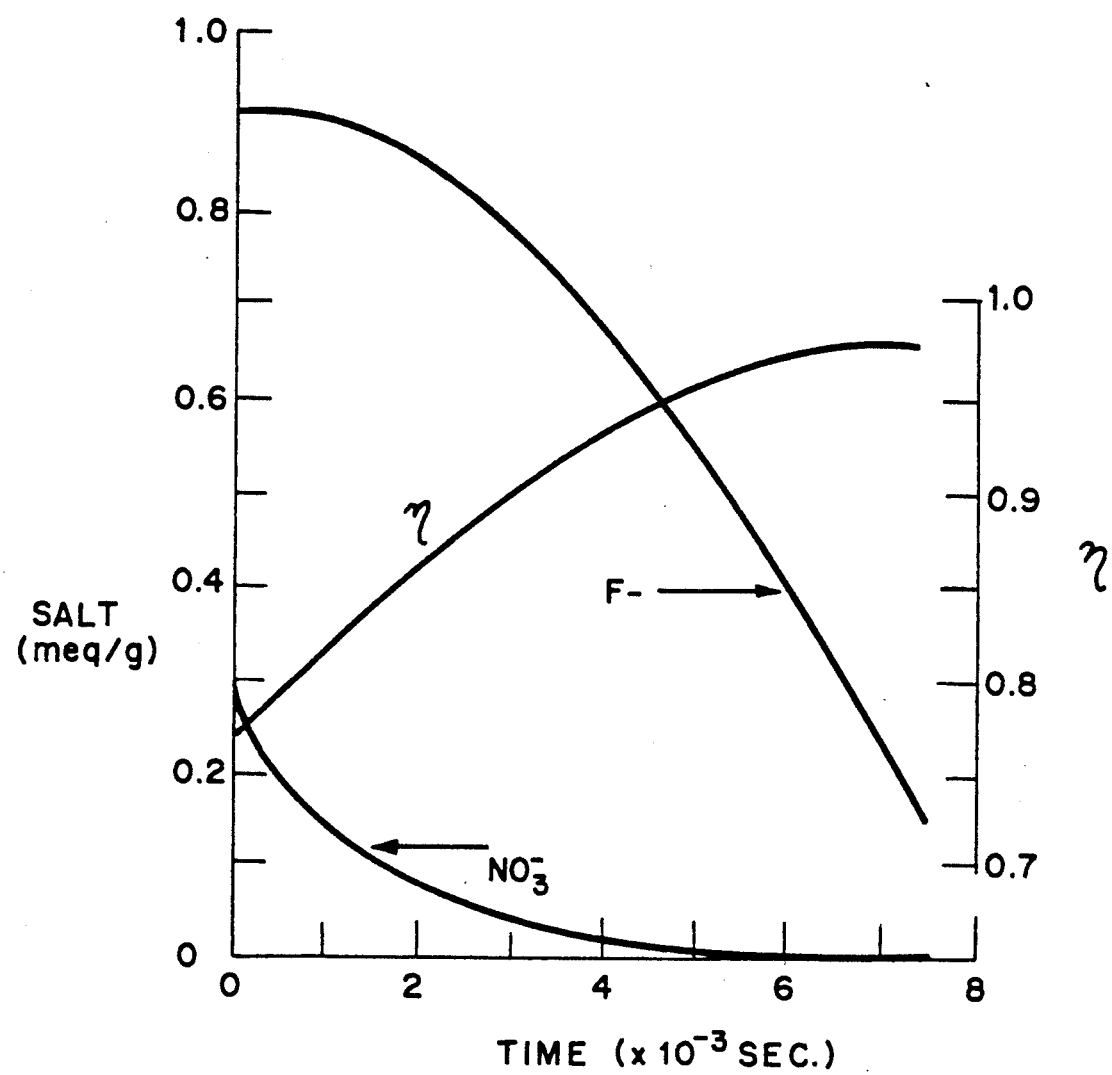
FIG. 4 graphically illustrates the efficiency of the reaction in the salt compartment of a three-compartment electrodialytic water splitter when operated in accordance with the process of the present invention.
Figure 5:
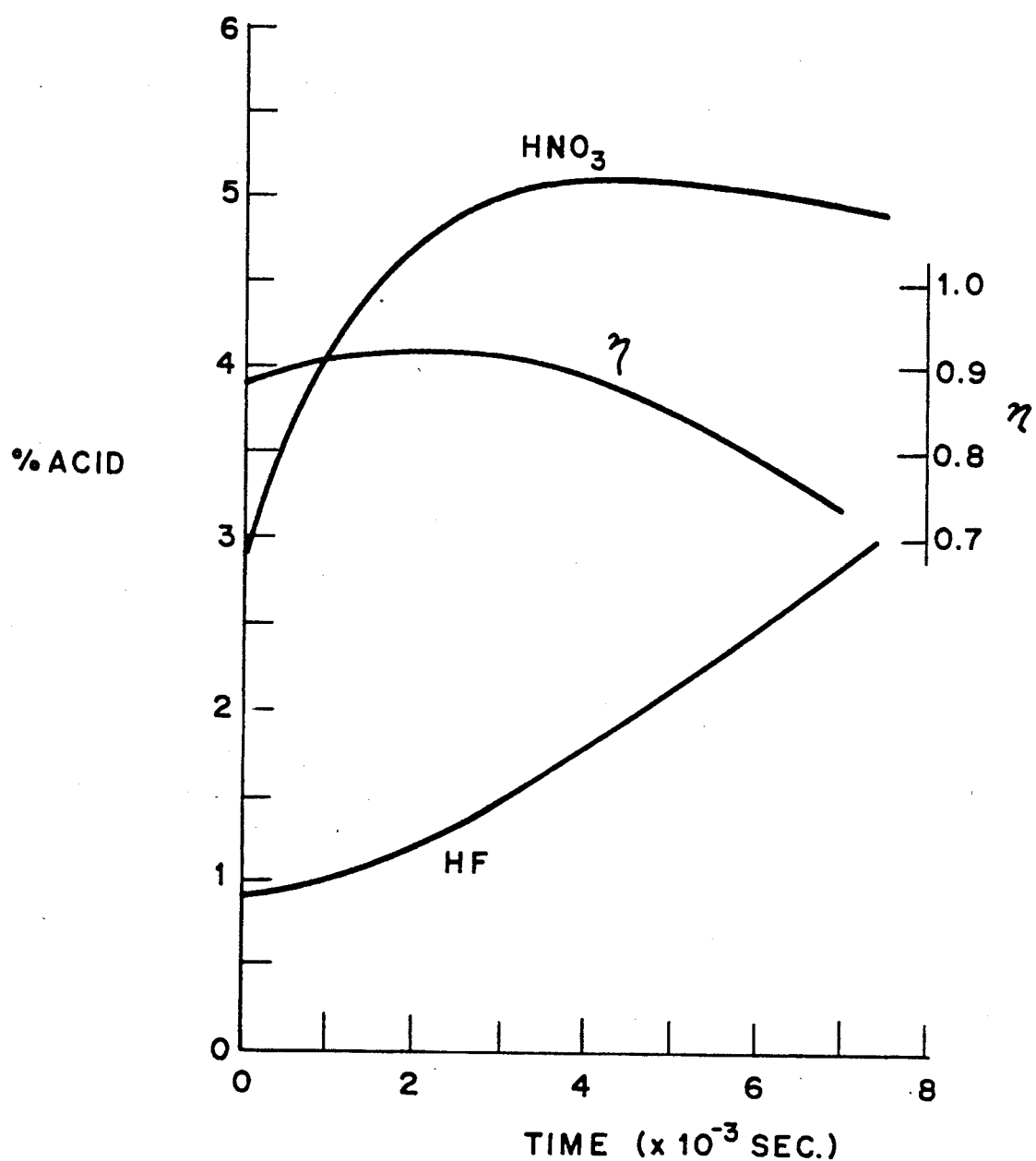
FIG. 5 graphically illustrates the substantially increased efficiency for producing a 5% concentration of $HNO_3$ when operating a three-compartment electrodialytic water splitter in accordance with the process of the present invention.

Typically, the process is capable of producing HF at a concentration of up to about 15% by weight and the additional acid or acids at a total wt % of up to about 12% at unexpectedly high efficiencies. FIG. 3 graphically illustrates the efficiency for the production of $HNO_3$ from $KNO_3$ as a function of $HNO_3$ concentration in the acid compartment of a three-compartment electrodialytic water splitter. FIGS. 4 and 5 graphically illustrate the unexpectedly improved efficiency for the production of nitric acid from nitrate when fluoride is also present in the salt compartment. The graphs were generated from test data gathered from using an electrodialytic water splitter having unit cells comprising an Asahi ASV anion membranes, cast bipolar membranes of the type disclosed in U.S. Pat. No. 4,116,889, and Dupont Nafion ® 324 cation membranes to produce 5% by weight nitric acid. As is clearly indicated from FIG. 3, the efficiency of nitric acid production dropped steadily from about 0.8 at 1% $HNO_3$ to about 0.6 at 5% $HNO_3$, with continuously decreasing efficiency at higher concentrations. In accord with our invention, FIG. 4 illustrates the highly efficient transfer of fluoride and nitrate ions from the salt compartment to the acid compartment and similarly, FIG. 5 illustrates the highly efficient production of mixed acids in the acid compartment, in particular concentrated nitric acid. As is clearly indicated from FIG. 5, the efficiency of producing 5% by weight nitric acid remains at about 0.8, with an efficiency of about 0.7 for a 7% by weight acid solution (as compared to an efficiency of about 0.5 for a 7% nitric acid solution in the absence of fluoride). Moreover, FIGS. 4 and 5 illustrate a principal mechanism of the process of the invention; namely, the preferential transfer of nitrate ions as compared to fluoride ions and the corresponding increased rate of production of nitric acid as compared to the rate of production of hydrofluoric acid.

The following examples illustrate the practice of the present invention. These examples should not be construed in any way as limiting the invention to anything less than that which is expressly disclosed or which would have been obvious to one of ordinary skill in this art therefrom.

EXAMPLE 1

Spent processing liquor having the following chemical composition was subjected to pretreatment steps prior to being subjected to electrodialytic splitting in accordance with applicants' invention:

| Ion | % Concentration |
| --- | --- |
| $F^-$ | ≈5.5 |
| $NO_3^-$ | ≈12.7 |
| Heavy Metals | ≈6.7 |

The density of the liquor was about 1.25 g/mL, and the acidity of the liquor was approximately 6.0 meq-$^-$OH/mL to pH 7.

Samples of the liquor were initially treated with 2M $NH_3$ and 2M KOH to determine the effectiveness for precipitating the heavy metals from the liquor and the filtration rates. Four hundred ml of the process liquor was treated with 1200 ml of 2.0M base (KOH or $NH_3$). In each instance, the filtrate was collected and the cake washed with 400 ml $H_2O$. The cake was vacuumed dry and the wash collected. Fluoride ions and nitrate ion analysis indicated the following approximate balance:

TABLE 1

| Solution | Volume (mL) | Wt. $F^-$ (g) | Wt. $NO_3^-$ (g) |
| --- | --- | --- | --- |
| Sample 1 ($NH_3$ treated) | | | |
| Pickle liquor | 400 | 26.9 | 63.4 |
| Filtrate | 1200 | 15.6 | 46.8 |
| Wash | 470 | 4.1 | 10.7 |
| Cake | (62.7 g) | 9.4 | 5.0 |
| Sample 2 (KOH treated) | | | |
| Pickle liquor | 400 | 26.9 | 63.4 |
| Filtrate | 1670 | 25.2 | 64.1 |
| Wash | 1670 | 25.2 | 64.1 |
| Cake | (72.8 g) | 2.3 | 2.0 |

The results of these pretreatment steps indicated that KOH was generally more effective in precipitating heavy metal ions.

EXAMPLE 2

For each test reported hereinbelow a three unit cell, three-compartment electrodialytic water splitter was employed. The electrodialytic water splitter was constructed principally with ASV anion membranes, Nafion ® 324 cation membranes, and Allied bipolar membranes made in accordance with the procedure disclosed in U.S. Pat. No. 4,116,889. Exposed membrane area for each membrane is about 17 $cm^2$. Tests were conducted in batch fashion with solutions being recirculated through the respective compartments of the electrodialytic water splitter. In most cases, estimates of current efficiency were made by measuring concentration and volume changes.

COMPARATIVE TEST 1

The electrodialytic water splitter described was operated under the following conditions:

| | |
|---|---|
| Current = | 1.90 A |
| Δ E = | 12.4 (v) min. |
| T = | 28–35° C. |

The salt compartment was initially charged with 1M $KNO_3$. Water was initially supplied to the acid base compartments. During the test (7200 second in duration), 431 ml of 1.001M $HNO_3$ was metered to the base compartment to keep the pH≈7. Concentration of $HNO_3$ in the acid and salt compartments were determined periodically, as well as the volumes in calibrated reservoirs. Relevant concentrations and volumes are reported in Table 2 below:

TABLE 2

| ACID | | | SALT | | |
|---|---|---|---|---|---|
| Time(s) | % $HNO_3$ | Volume (mL) | Time(s) | % $HNO_3$ | Volume (mL) |
| 150 | 1.44 | 295 | 200 | .028 | 495 |
| 1750 | 2.98 | 300 | 1800 | .168 | 482 |
| 3600 | 4.52 | 305 | 3640 | .355 | 468 |
| 5300 | 5.71 | 309 | 5330 | .515 | 455 |
| 7100 | 6.78 | 314 | 7120 | .638 | 445 |

The calculated current efficiency and acid concentration as a function of time were plotted to generate FIG. 3. Also, it is important to note the increased acidification of the salt as the testing time increased. This is the result of $H^+$ ions leaking into the salt compartment.

Test 2

In accordance with the basic concept of the present invention, mixed salts of KF and $KNO_3$ were supplied to the three-compartment electrodialytic water splitter described above. The three-compartment electrodialytic water splitter was operated under the following conditions:

| | |
|---|---|
| Current = | 1.90 A |
| Δ E = | 13.6 (v) min |
| T = | 28–37° C. |

In addition to analysis for acidity, the acid and salt were analyzed by ion chromatography for $F^-$ and $NO_3^-$. Results are tabulated in Table 3 below:

TABLE 3

| | | Salt | | |
|---|---|---|---|---|
| Time(s) | Meq/g $H^+$ | % F | % $NO_3$ | Volume (mL) |
| 70 | .003 | 5.26 | 2.43 | 386 |
| 1715 | .012 | 5.09 | 1.02 | 368 |
| 3560 | .006 | 4.28 | 0.24 | 355 |
| 5560 | .004 | 2.71 | 0.05 | 327 |
| 7250 | .003 | 1.11 | 0.02 | 309 |

| | | Acid | | |
|---|---|---|---|---|
| Time(s) | Meq/g $H^+$ | % HF | % $HNO_3$ | Volume (mL) |
| 50 | 0.91 | .93 | 2.89 | 227 |
| 1715 | 1.27 | 1.14 | 4.57 | 236 |
| 3515 | 1.62 | 1.61 | 5.06 | 241 |
| 5530 | 1.99 | 2.33 | 5.14 | 250 |
| 7210 | 2.25 | 2.90 | 4.92 | 255 |

Using the experimental data from Table 3, the efficiency for salt transfer and hydrogen ion production was calculated and is graphically illustrated in FIGS. 4 and 5. From the data, it is clear that nitrate was transported in preference to fluoride ions. From the salt analysis, apparently $HF_2^-$ is transported in preference to fluoride ion as the salt does not become very acidic during the experiment, even at high nitric acid concentrations.

Test 3

A three-compartment electrodialytic water splitter of a construction described above was charged with the following solutions:

| | | |
|---|---|---|
| Base Compartment | 480 mL | 0.5M KOH |
| Acid Compartment | 305 mL | 1% $HNO_3$ |
| Salt Compartment (1.30% F, 3.90% $NO_3^-$) | 415 mL | Filtrate of Sample 1 |

The three-compartment electrodialytic water splitter was operated under the following conditions:

| | |
|---|---|
| Current = | 1.90 A |
| Δ E = | 15.9 (V) min |
| T = | 26–38° C. |

The process was operated in a batch mode. At the end of a batch, a portion of the acid was removed and replaced with $H_2O$, and the salt was removed and replaced with fresh filtrate. The results of a three-batch test are summarized in Table 4 below:

TABLE 4

| Batch No. | Acid (meq/g) | | Base N | | Duration(s) | Current Efficiency | |
|---|---|---|---|---|---|---|---|
| | Initial | Final | Initial | Final | | Acid | Base |
| 1 | 0.16 | 1.32 | 0.54 | 1.25 | 8200 | 0.81 | 0.83 |
| 2 | 0.91 | 2.00 | 1.25 | 1.85 | 9660 | 0.78 | 0.75 |
| 3 | 1.47 | 1.99 | 1.85 | 2.17 | 5600 | 0.68 | 0.70 |

The final acid from Batch No. 3 was 1.49% HF/8.52% $HNO_3$ at a current efficiency of about 0.7.

Test 4

A three-compartment electrodialytic water splitter of generally the same construction described above was charged with the following solutions:

| | | |
|---|---|---|
| Base Compartment | 500 mL | 0.4 N KOH |
| Acid Compartment | 300 mL | 1% $HNO_3$ |
| Salt Compartment (0.80M KF, 0.6M $KNO_3$) | 500 mL | Filtrate of Sample 2 |

The three-compartment electrodialytic water splitter was operated under the same conditions as in Test 3. The process was again operated in a batch mode, with the replacement of salt solution occurring at the end of Production Batch No. 1. The results of the two batch test are reported in Table 5 below:

TABLE 5

| Batch No. | Acid (meq/g) Initial | Acid (meq/g) Final | Base N Initial | Base N Final | Duration(s) | Current Efficiency Acid | Current Efficiency Base |
|---|---|---|---|---|---|---|---|
| 1 | 0.16 | 1.63 | 0.40 | 1.34 | 9500 | 0.89 | 0.90 |
| 2 | 1.14 | 2.19 | 1.34 | 2.05 | 9000 | 0.76 | 0.84 |

The salt was 0.41M KF/0.01 $KNO_3$ after Batch No. 1 and 0.53M KF/0.03M $KNO_3$ after Batch No. 2. The acid after Batch No. 1 was about 0.63M HF/1.07M $HNO_3$, and after Batch 2 was about 0.81M HF/1.53M $HNO_3$. Note again the high currency efficiency for each batch.

EXAMPLE 3

Four batches of $KF/KNO_3$ filtrate were prepared from a spent process liquor for use in a five-day test. The first two batches were prepared by KOH precipitation followed by a precipitation wash with 400 ml of $H_2O$. For batches 3 and 4, the precipitate was washed with 300 ml of depleted salt from previous batches and 300 ml of $H_2O$. For Batches 3 and 4, base generated by electrodialytic water splitting of Batches 1 and 2 was used to prepare the salt feed with fresh KOH being added to adjust the concentration of the generated base to 2M and to make-up. After each batch run, the acid and base were drained to 500 ml. The drained acid was replaced with fresh water and the drained base was replaced with depleted salt from the previous batch. The electrodialytic water splitter employed was of the same construction as the electrodialytic water splitter used in Test 4 of Example 1. The electrode rinse flow in Batches 1 and 2 was $K_2SO_4$ and in Batches 3 and 4 was 0.5M KOH. The results of the batch runs are summarized in Table 6 below:

TABLE 6

| Batch No. | Duration Hr. | Initial | Final | Approximate Current Efficiency |
|---|---|---|---|---|
| | | Acid (meq/g) | | |
| 1 | 23.0 | 0.16 | 1.67 | .84 |
| 2 | 19.8* | 0.33 | 1.54 | — |
| 3 | 23.7 | 0.36 | 1.76 | .81 |
| 4 | 23.2 | 0.42 | 1.84 | .82 |
| | | Base (N) | | |
| 1 | 23.0 | 0.5 | 1.97 | .85 |
| 2 | 19.8* | 0.39 | 1.24 | — |
| 3 | 23.7 | 0.34 | 1.30 | .85 |
| 4 | 23.2 | 0.38 | 1.32 | .82 |
| | | Salt N | | |
| 1 | 23.0 | 1.28 | 0.47 | .92 |
| 2 | 19.8* | 1.24 | 0.61 | — |
| 3 | 23.7 | 1.30 | 0.23 | .87 |
| 4 | 23.2 | 1.32 | 0.41 | .89 |

*Current <1.9 A for undertermined time; electrode rinse flow (through anolyte and catholyte compartments) was blocked by a precipitate of $K_2SO_4$ 2.9 hours at 1.30 A A mathematical analysis of the solution from Batch No. 4 confirming the experimental results is summarized below:

TABLE 7

| | |
|---|---|
| Initial Salt (4.5 L) 0.48M $NO_3^-$; 0.84M $F^-$ | (Total by IEX ≈ 1.32M) |
| Final Salt (3.76 L) .005M $NO_3^-$; 0.39M $F^-$ | (Total by IEX ≈ 0.4M) |
| *IEX = Ion Exchange | |
| $\Delta NO_3^-$ = 4.5 L × .48 moles/L − 3.76 L × .005 moles/L = | 2.14 moles |
| $\Delta F^-$ = 4.5 L × .84 moles/L − 3.76 L × .39 moles/L = | 2.31 moles |
| Total = | 4.45 moles lost |
| Theoretical yield = | 4.93 moles lost |
| Current Efficiency ($\eta$) = | 4.45/4.93 ≈ .90 |
| Initial Acid (2.50 L) 0.19M $HNO_3$; 0.22M HF | (Total $H^+$ ≈ 0.42M) |
| Final Acid (2.76 L) 0.94M $HNO_3$; 0.97M HF | (Total $H^+$ ≈ 1.84M) |
| $\Delta HNO_3$ = (.94) (2.76) − (.19) (2.50) = | 2.12 moles $HNO_3$ gained |
| $\Delta HF$ = (.97) (2.76) − (.22) (2.50) = | 2.13 moles HF gained |
| Total = | 4.25 moles |
| Theoretical yield = | 4.93 moles gained |
| Current efficiency ($\eta$) | ≈ .86 |

As is quite clear from the results of applicants' experiments, the process operates at current efficiencies which are unexpectedly higher as compared to the efficiency attainable for the production of a single strong acid.

The above description gives a detailed discussion of applicants basic invention and of applicants preferred embodiments. It will be obvious to those of ordinary skill in the art that various modifications and changes and/or alterations may be made without varying the scope of the present invention as defined by the appended claims.

We claim:

1. A process for recovering a mixed acid solution comprising hydrofluoric acid from a solution comprising salts of the acids to be recovered comprising the steps of:

(a) providing an electrodialytic water splitter comprising at least two unit cells, each unit cell comprising a means for splitting water comprising a bipolar membrane or spaced apart anion and cation membranes, a first compartment and a second compartment, said electrodialytic water splitter additionally comprising a single pair of anode and cathode electrodes said at least two unit cells being between the anode electrode and the cathode electrode;

(b) feeding an aqueous solution comprising at least two salts formed from at least two different anions to the first compartment, one of said anions being fluoride anions;

(c) feeding a liquid comprising water to the second compartment;

(d) passing current through said electrodialytic water splitter to produce an aqueous product comprising mixed acids formed from the different anions in the second compartment, and an aqueous salt-containing product comprising a reduced concentration of said anions in the first compartment; and (e) recovering aqueous product comprising hydrofluoric acid from the second compartment.

2. The process of claim 1 wherein the at least one unit cell further comprises a third compartment.

3. The process of claim 2 wherein a liquid comprising water is fed to the third compartment, and wherein a basified aqueous solution is produced in the third compartment upon passing the current therethrough.

4. The process of claim 3 further comprising the step of pretreating a spent process material comprising the at least two different anions, one of which is fluoride anion, with the basified aqueous solution to produce the aqueous solution.

5. The process of claim 4 wherein the spent process material is spent pickling liquor.

6. The process of claim 5 wherein the aqueous solution comprises alkali metal fluoride and alkali metal nitrate.

7. The process of claim 4 wherein the spent process liquor is spent stainless steel pickling liquor.

8. The process of claim 7 wherein the spent stainless steel pickling liquor further comprises nitrate ions.

9. The process of claim 8 wherein the basified aqueous solution comprises aqueous potassium hydroxide.

10. The process of claim 1 wherein another of said at least two different anions is selected from the group consisting of chloride, sulfate, nitrate, and phosphate.

11. The process of claim 1 further comprising the step of pretreating a spent process material comprising the at least two different anions, one of which is fluoride anion, to produce the aqueous solution.

12. The process of claim 11 wherein the step of pretreating the spent process material comprises contacting the spent process material with a basified aqueous solution.

13. The process of claim 1 wherein the means for water splitting is a bipolar membrane.

14. A process for recovering mixed acids from spent stainless steel pickling liquor comprising at least two different anions, one of which if fluoride anion, and heavy metal cations comprising the steps of:
(a) contacting the spent stainless steel pickling liquor with a basified aqueous solution to produce a solution a solution comprising salts of the acids to be recovered, one of which is a fluoride salt, and a precipitate comprising heavy metal ions;
(b) recovering said precipitate;
(c) subjecting the solution comprising salts to electrodialytic water splitting in an electrodialytic water splitter to produce a mixed acid product comprising hydrofluoric acid, the electrodialytic water splitter comprising at least two unit cells, each unit cell comprising a means for splitting water comprising a bipolar membrane or spaced apart anion and cation membranes, a first compartment and a second compartment, said electrodialytic water splitter additionally comprising a single pair of anode and cathode electrodes said at least two unit cells being between the anode electrode and the cathode electrode; and
(d) recovering the mixed acid product from one of the compartments.

15. The process of claim 14 wherein the means of water splitting is a bipolar membrane.

* * * * *